(12) United States Patent
Ogawa et al.

(10) Patent No.: US 7,068,452 B2
(45) Date of Patent: Jun. 27, 2006

(54) METHOD FOR RECORDING MAGNETIC INFORMATION AND MAGNETIC RECORDING SYSTEM

(75) Inventors: Susumu Ogawa, Fujimi (JP); Hiromasa Takahashi, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/071,360

(22) Filed: Mar. 4, 2005

(65) Prior Publication Data

US 2006/0044661 A1    Mar. 2, 2006

(30) Foreign Application Priority Data

Aug. 25, 2004   (JP)   ............... 2004-245476

(51) Int. Cl.
G11B 5/02    (2006.01)
G11B 5/62    (2006.01)

(52) U.S. Cl. ......................................... 360/55; 369/126
(58) Field of Classification Search ............ None
See application file for complete search history.

(56) References Cited

U.S. PATENT DOCUMENTS

| | | | | |
|---|---|---|---|---|
| 5,940,314 A * | 8/1999 | Suzuki et al. | ............. | 365/10 |
| 5,949,600 A * | 9/1999 | Akiyama et al. | ............. | 360/55 |
| 6,061,265 A * | 5/2000 | Hannah | ............. | 365/121 |
| 6,388,912 B1 * | 5/2002 | Hannah et al. | ............. | 365/121 |
| 6,480,412 B1 * | 11/2002 | Bessho et al. | ............. | 365/173 |
| 6,741,524 B1 * | 5/2004 | Ichihara et al. | ............. | 360/59 |
| 6,770,386 B1 * | 8/2004 | Hara et al. | ............. | 428/831 |
| 6,865,044 B1 * | 3/2005 | Albrecht et al. | ............. | 360/59 |
| 6,906,879 B1 * | 6/2005 | Albrecht et al. | ............. | 360/55 |
| 6,912,148 B1 * | 6/2005 | Hannah et al. | ............. | 365/120 |
| 6,930,847 B1 * | 8/2005 | Kai et al. | ............. | 360/59 |
| 2003/0102863 A1 * | 6/2003 | Wu | ............. | 324/244 |
| 2004/0228024 A1 * | 11/2004 | Ogawa et al. | ............. | 360/69 |
| 2005/0128886 A1 * | 6/2005 | Ogawa et al. | ............. | 369/126 |
| 2005/0163962 A1 * | 7/2005 | Kawato et al. | ............. | 428/65.3 |

FOREIGN PATENT DOCUMENTS

| | | |
|---|---|---|
| JP | 2001-196661 | 4/2000 |
| JP | 2004-342183 | 5/2003 |

OTHER PUBLICATIONS

J. C. Slonczewski, "Current-Driven Excitation Magnetic Multilayers", Journal of Magnetism and Magnetic Materials, vol. 159 (1996), pp. L1-L7.

J.E. Mattson et al., "Photoinduced Antiferromagnetic Interlayer Coupling in Fe/(Fe-Si) Superlattices", The American Physics Society, Physical Review Letters, vol. 71, No. 1 (Jul. 5, 1993), pp. 185-188.

Chun-Yeol You et al., "Voltage Controlled Spintronic Devices for Logic Applications", Journal of Applied Physics, vol. 87, No. 9 (May 1, 2000), pp. 5215-5217.

* cited by examiner

Primary Examiner—K. Wong
Assistant Examiner—James L Habermehl
(74) Attorney, Agent, or Firm—Reed Smith LLP; Stanley P. Fisher, Esq.; Juan Carlos A. Marquez, Esq.

(57) ABSTRACT

Stable writing is performed in a super high density hard disk where writing by magnetic field is difficult. A layered thin film structure including at least a magnetic metallic layer/a non-magnetic metallic layer/a magnetic metallic layer is formed, and a metallic probe is brought close to this multilayer film on the order of nano-meters. A quantum well state created in the multilayer film is changed by applying a voltage between the metallic probe and the multilayer film, resulting in a relative magnetic field between the magnetic metallic layers being changed. At this time, an assistance magnetic field is applied in the writing magnetization direction.

12 Claims, 11 Drawing Sheets

METHOD FOR RECORDING MAGNETIC INFORMATION AND MAGNETIC RECORDING SYSTEM

CLAIM OF PRIORITY

The present application claims priority from Japanese application JP 2004-245476 filed on Aug. 25, 2004, the content of which is hereby incorporated by reference into this application.

FIELD OF THE INVENTION

The present invention relates to a means for reading and writing magnetic information in a recording medium, and a magnetic recording system.

BACKGROUND OF THE INVENTION

A writing technique by a magnetic head, which uses a magnetic field generated from a coil, has been used for writing magnetic information in a hard disk drive (HDD) of the prior art. There has been a demand for even higher recording density in HDDs, and it is known that the magnetic field strength, which can be generated by the magnetic head, is reduced due to the influence of demagnetization field components generated at the tip of the magnetic head when the magnetic head is made minute according to the refinement of the recording domains by increasing density. Moreover, when the recording domain becomes minute, a material having a greater magnetic anisotropy is necessary to overcome the thermal instability of the written magnetization direction, so that a greater writing magnetic field is required. Therefore, in a writing technique for high recording density, it is expected that there is a limit for those which use only a magnetic head of the prior art, and a new writing technique is required as an alternative to them.

For instance, a writing technique by a so-called thermal assistance method is proposed. This is a writing technique in which the coercivity is reduced only at the region being written by locally heating the recording medium using a laser beam and by applying a magnetic field. This technique is promising as a magnetic writing technique for high density recording because the writing magnetic field can be reduced. However, since the region to which the laser beam can be focused becomes a heated region, its miniaturization is a problem.

For instance, as a writing technique in which no magnetic field is used, non-patent document 1 proposes a writing technique which uses a spin injection flux reversal. This is a writing technique in which flux reversal is performed by injecting spin-polarized electrons into a magnetic material. However, wiring becomes necessary since the writing current threshold is as high as $10^6$–$10^7$ A/cm$^2$ and enough current can not flow without contacting the medium, so that it is not suitable for a writing technique in a non-wiring super high density recording medium such as HDD.

Furthermore, a magnetization control technique using an electric field is proposed as another writing technique. For instance, non-patent document 2 discloses one that tries to control the exchange interaction created between the ferromagnetic materials by controlling the carrier density in the semiconductor layer using an electric field in a lamination structure of ferromagnetic metal/semiconductor/ferromagnetic metal. Moreover, for instance, non-patent document 3 discloses one that tries to control the exchange interaction created between the ferromagnetic materials by providing an insulator layer inside the triple-layered structure of ferromagnetic metal/non-magnetic metal/ferromagnetic metal, such as ferromagnetic metal/non-magnetic metal/insulator layer/ferromagnetic metal, and by applying a voltage between the ferromagnetic metallic layers. Moreover, for instance, patent document 1 discloses one that tries to control the exchange interaction created between the ferromagnetic materials by providing a semiconductor layer outside of the triple-layered structure of ferromagnetic metal/non-magnetic metal/ferromagnetic metal and by controlling the width and height of the Schottky barrier created at the interface between the ferromagnetic metallic layer and the semiconductor by using an electric field. These magnetization control techniques using an electric field make it possible to achieve high density and they are promising as techniques with low power consumption.

[Patent document 1] JP-A No. 196661/2001
[Non-patent documents 1] J. Slonczewski, J. Mag. Mag. Mater. 159, L1 (1996)
[Non-patent documents 2] Mattsonet et al, Phys. Rev. Lett. 71, 185 (1993)
[Non-patent documents 3] Chun-Yoel Youi et al., J. Appl. Phys., 87, 5215 (2000)

SUMMARY OF THE INVENTION

In order to provide a semiconductor layer or insulator layer inside of the above-mentioned triple-layered structure of ferromagnetic metal/non-magnetic metal/ferromagnetic metal and to be possible to control the magnetization by voltage, it is necessary to control the thickness to be extremely thin, as thin as about 2 nm or less, and, in the case when a semiconductor layer is provided outside of the triple-layered structure, it is necessary to form a steep metal/semiconductor interface on the level of an atomic layer, therefore, fabricating these are extremely difficult. Moreover, a wiring-type memory such as MRAM, which is lower density as compared to an HDD, is assumed as a medium, and it is difficult to apply a voltage to a non-wiring super high recording density medium such as an HDD.

The present invention was performed considering the problems of the prior art; it is an objective of the present invention to provide a means and a system for reading/writing magnetic information in a high density and with stability to a non-wiring magnetic recording medium.

In order to achieve the above-mentioned objective, the present inventors developed a recording technique to control the magnetization of the recording region of a medium by an electric field generated between the metallic probe and the medium and to assist writing by using a magnetic field and heat. A magnetic recording medium, which has at least three layers of a thin film structure of ferromagnetic metal/non-magnetic metal/ferromagnetic metal, is used for a recording medium. A protection film may be provided outside of the three layers of the thin film structure. It is already known that a quantum well level is formed in the non-magnetic metallic thin film according to the combination of the ferromagnetic metal and the non-magnetic metal. A metallic probe is made to approach the three layers of the thin film structure or the multilayer film including the protection film. The image potential of the surface of the multilayer film can be modulated by letting the metallic probe approach to a distance on the order of 0 to 10 nm from the surface of this multilayer film and by applying an electric field from the metallic probe. This image potential confines electrons in the multilayer film and the confinement conditions are changed when this potential is modulated. As a result, the energy of the quantum level formed in the multilayer film changes, and the magnitude of the exchange interaction working between the two layers of the ferromagnetic metals changes. It is possible to reverse the relative magnetization direction in the multilayer film by reversing the positive and the negative of this exchange interaction.

The size of the region to which the image potential is modulated can be made minute even down to the atomic level, although it depends on the distance between the probe and the surface of the medium. Writing continues until the flux reversal reaches the flux volume which is stabilized by the magnetic anisotropy of the medium. The magnetization during writing is stabilized by simultaneously applying an external magnetic field so weak that the flux reversal does not occur outside of the writing region in the same direction as the writing magnetization direction, resulting in more stable writing being possible. Moreover, it is possible to reduce the threshold of the writing electric field by applying simultaneously an electric field and an external magnetic field. This reduction of the threshold of the writing electric field can be made by heating the writing region and reducing the coercivity of the heated medium. That is, it is possible to make the magnetization stable during writing and to reduce the threshold of the writing electric field as a means for assisting the magnetization direction control of the writing region. Moreover, it is also possible to reduce the threshold of the writing electric field by using thermal assistance in which the medium is heated.

That is, a magnetic information recording technique of the present invention includes a step for positioning a metallic probe opposite the multilayer film which includes a first ferromagnetic metallic layer, the non-magnetic metallic layer formed over the first ferromagnetic metallic layer, and a second ferromagnetic metallic layer formed over the non-magnetic metallic layer, and a step for applying an electric field between the multilayer film and the metallic probe and for assisting the magnetization direction control of the multilayer film by using the metallic probe, wherein magnetic information is written by forming a magnetization corresponding to the electric field applied to the region of the multilayer film which is opposite the metallic probe. The assistance of magnetization direction control of the multilayer film by the metallic probe is performed by applying a weak magnetic field along the writing magnetization direction or by heating the writing region.

Moreover, a magnetic recording system of the present invention comprises: a magnetic recording medium which provides a multilayer film including a first ferromagnetic metallic layer, a non-magnetic metallic layer formed over the first ferromagnetic metallic layer, and a second ferromagnetic metallic layer formed over the non-magnetic metallic layer, a metallic probe which is positioned opposite the magnetic recording medium, a means for applying an electric field between the metallic probe and the magnetic recording medium, and a means for assisting the magnetization direction control of the multilayer film by using the metallic probe, wherein the electric field between the metallic probe and the magnetic recording medium is changed and the assistance means is applied, thereby, the magnetic information is written by forming magnetization corresponding to the applied electric field in the region of the multilayer film which is opposite the metallic probe. The assistant means consists of a means for applying a weak magnetic field along the writing magnetization direction or a means for heating the writing region.

It is an object of the present invention that high density, low power consumption, and non-contact magnetic recording is carried out in a magnetic recording medium.

DETAILED DESCRIPTION OF THE INVENTION

Hereinafter, the preferred embodiments of the present invention will be described with reference to the accompanying drawing as follows. In each of the following drawings, the same functional part will be shown using the same code.

EMBODIMENT 1

Figure 1:
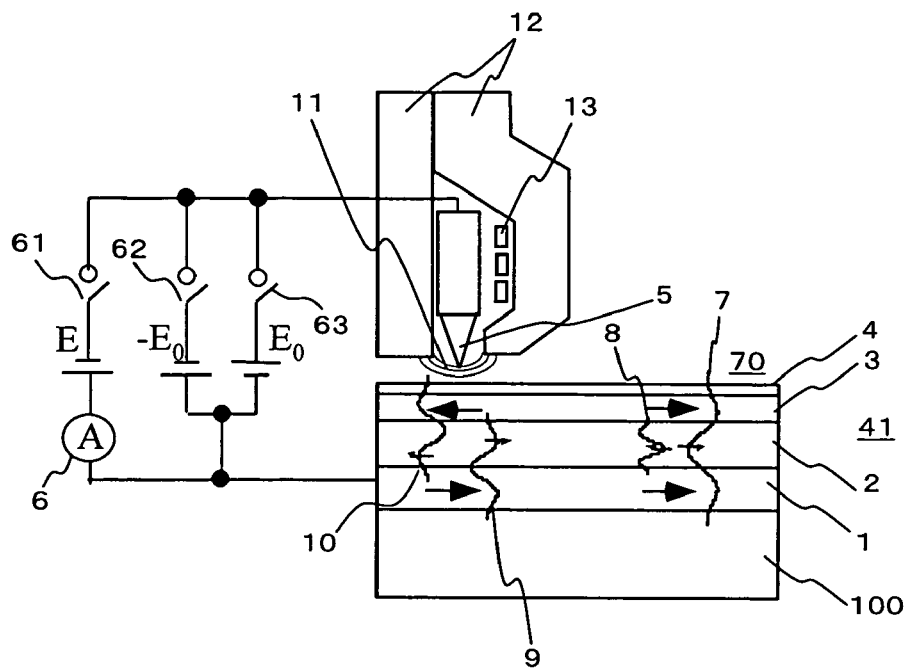
FIG. 1 is a conceptual illustration showing one example of a main part of a magnetic recording system of the present invention.

FIG. 1 is a conceptual illustration showing one example of a main part of a magnetic recording system of the present invention. The figure shows a magnetic recording medium 70, and a metallic probe 5 and a magnetic pole 12 which are provided opposite it. The magnetic recording medium 70 consists of a multilayer film 41 providing a ferromagnetic metallic layer 1, non-magnetic metallic layer 2, the ferromagnetic metallic layer 3, and a protection film 4 which are formed by laminating in order on a substrate 100. The metallic probe 5 is placed at an extremely short distance, which is on the order of 1 nm, opposite the protection film 4 of the multilayer film 41. The metallic probe 5 is held by the same mechanism as the slider mechanism in a hard disk system. In order to control the distance between the protection film 4 and the metallic probe 5, a tunneling current may be used separately as a feedback signal. Furthermore, the feedback signal may be created by using an optical lever technique in an atomic force microscope. Moreover, a probe for controlling the distance may be provided separately, from such as the metallic probe 5 for controlling the electric field described below.

For instance, a ferromagnetic single metal such as Fe, Co, and Ni, etc. or an alloy such as CoFe, NiFe, and CoNi, etc. can be used for the ferromagnetic metallic layers 1 and 3 constituting the multilayer film 41. For instance, a metal such as Au, Ag, Cu, Pt, and Pd, etc. can be used for the non-magnetic metallic layer 2. A non-magnetic noble metal, for instance Au, is used for the protection film 4, but there may not be a protection film 4. In this embodiment, Fe was used for the ferromagnetic metallic layers 1 and 3; Au was used for the non-magnetic metallic layer 2; and Au was used for the protection film 4.

Electrons in the neighborhood of the Fermi level in the multilayer film 41 is confined in the multilayer film, forming the quantum well state 7 to 10. In the case when the magnetization direction of the ferromagnetic metallic layers 1 and 3 are parallel to each other, electrons having an electron spin antiparallel to the magnetization are almost confined in the non-magnetic metallic layer 2 like the quantum well state 8. On the other hand, electrons having an electron spin direction parallel to the magnetization are entirely confined in the multilayer film 41 like the quantum well state 7. On the other hand, in the case when the magnetization direction of the ferromagnetic metallic layers 1 and 3 are antiparallel, electrons are confined in films which are different from each other depending on the spin direction such as the quantum well state 9 or the quantum well state 10.

The electronic states forming these quantum wells not only depend on the magnetization directions of the ferromagnetic metallic layers 1 and 3, but also depend on the surface potential of the protection film 4. When the metallic probe 5 is brought close to the surface of the protection film 4, the image potentials of the protection film 4 and the metallic probe 5 overlap, resulting in the effective potential being deformed in which the quantum well is confined.

On the other hand, in the state in which the distance between the surface of the protection film 4 and the metallic probe 5 is maintained at a predetermined value, a voltage of $E_0$ or $-E_0$ can be applied between the multilayer film 4 and the metallic probe 5. That is, when the switch 63 or 62 is selectively ON and the voltage of $E_0$ or $-E_0$ is applied, the confining potential at the surface of the protection film 4 is changed. As a result, since the boundary condition to confine the quantum well electrons is changed, the energy level of the quantum well electrons is changed. Since the relative magnetization directions of the ferromagnetic metallic layers 1 and 3 are changed as described later because of changing the energy of this quantum well level, information can be recorded depending on whether the magnetizations of the ferromagnetic metallic layers 1 and 3 are parallel or antiparallel to each other. Here, because the electric field between the metallic probe and the medium not only depends on the voltage of the metallic probe 5 but also the distance between the metallic probe and the medium, it is natural that the magnitude of the writing voltage $E_0$ or $-E_0$ also depends on the distance between the metallic probe and the medium.

The magnetic information written in the multilayer film 41 can be read out by making the switch 61 ON, applying the voltage E ($|E| \ll |E_0|$), and detecting the tunneling current flowing between the metallic probe 5 and the multilayer film 41 by using an ammeter 6. This is because the tunneling current measured under constant voltage E changes depending on the magnetization direction, since the energy level of the quantum well electrons formed in the multilayer film 41 changes depending on whether the magnetizations of the ferromagnetic metallic layers 1 and 3 are parallel or antiparallel.

Figure 2:
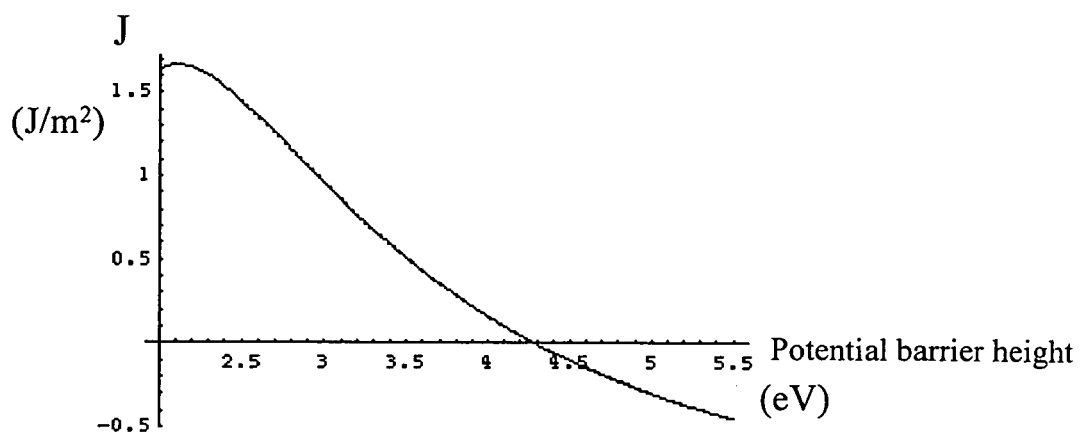
FIG. 2 is an example of a calculation of the magnetic exchange interaction energy as a function of surface potential barrier height.

FIG. 2 shows a result of a calculation of the magnitude of the magnetic exchange interaction energy working between the ferromagnetic metallic layers 1 and 3 (vertical line) with changing the height of the potential barrier at the surface (horizontal line) by using the metallic probe in the case when the ferromagnetic metallic layer 3 is 12ML (ML: monolayer) of Fe, the non-magnetic metallic layer 2 6ML of Au, the ferromagnetic metallic layer 1 Fe layer of sufficient thickness, and the protection film 4 6ML of Au. In the case of J being positive, the stable relative magnetization directions of the ferromagnetic metallic layers 1 and 3 are antiparallel, and, in the case of J being negative, a parallel condition is stable. It is possible to control the magnetic exchange interaction J working between the ferromagnetic metallic layers 1 and 3 to be positive and negative by deforming the potential at the surface of the protection film 4 by using the metallic probe 5, and it indicates that the relative magnetization directions of the ferromagnetic metallic layers 1 and 3 can be sufficiently rewritten by using the metallic probe 5.

Figure 3:
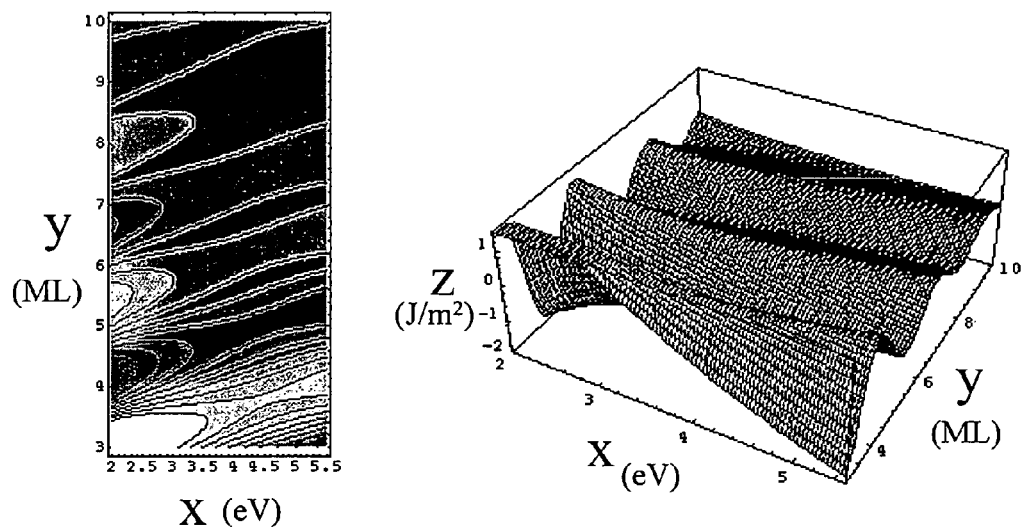
FIG. 3 is an example of a calculation of the magnetic exchange interaction energy as a function of surface potential barrier height (x) and thickness of a non-magnetic layer (y).

Accordingly, FIG. 3 shows the magnetic exchange interaction energy J (z-axis) working between the ferromagnetic metallic layers 1 and 3 when the height of the surface potential barrier is shown on the x-axis and the film thickness of the non-magnetic metallic layer 2 on the y-axis. It is understood that the magnitude of the magnetic exchange interaction energy J working between the ferromagnetic metallic layers 1 and 3 strongly depends on the thickness of the non-magnetic metallic layer 2. Moreover, this J value also depends on the thickness of the ferromagnetic metallic layers 1.

In the Au6ML/Fe12ML/Au6ML/Fe shown in FIG. 2, the magnetic exchange interaction energy J working between the ferromagnetic metallic layers 1 and 3 becomes almost zero in the vicinity of a potential barrier height of 4.3 eV.

The potential barrier height at the surface corresponds to the work function. In this system, since the work function at the outermost surface of Au is 5.5 EV or less, the magnetic exchange interaction energy J working between the ferromagnetic metallic layers 1 and 3 becomes almost zero when the thickness of Au of the non-magnetic metallic layer 2 is controlled to be, for instance, 7ML as expected from FIG. 3. Even in the case when the thickness of Au of the non-magnetic metallic layer 2 in FIG. 2 is 6ML, decreasing the work function by coating an alkaline metal and an alkaline earth metal such as Cs and Ba on the outermost surface and setting the potential barrier height to 4.3 eV make it possible to control the J value to be 0. In this condition, a magnetic interaction is not created between the ferromagnetic metallic layers 1 and 3.

At this time, the height of potential barrier can be changed by bringing the metallic probe close to the surface of the multilayer film and by applying a voltage $E_0$ or $-E_0$ between the metallic probe 5 and the multilayer film 41, thereby, the positive and negative of the magnetic exchange interaction J working between the ferromagnetic metallic layers 1 and 3 can be changed. For instance, when the potential of the metallic probe is made positive, the height of the potential barrier can be effectively made lower. On the other hand, when the potential of the metallic probe is made negative, it is possible to make the height of the potential barrier effectively higher.

As shown in FIG. 2, in the case the magnetic exchange interaction J becomes positive when the potential barrier becomes lower, the condition in which the magnetizations of the ferromagnetic layers 1 and 3 are antiparallel becomes stable as mentioned before, when the potential of the metallic probe is made positive. When the potential of the metallic probe is made negative, the condition in which the magnetizations of the ferromagnetic layers 1 and 3 are parallel becomes stable. Since the ferromagnetic metallic layer 3 has a coercivity caused by the magnetic anisotropy, the written magnetization direction is maintained because of the coercivity when the written flux volume is large enough, even if the magnetic exchange interaction J working between the ferromagnetic metallic layers 1 and 3 becomes almost 0 by removing the metallic probe 5.

Figure 4:
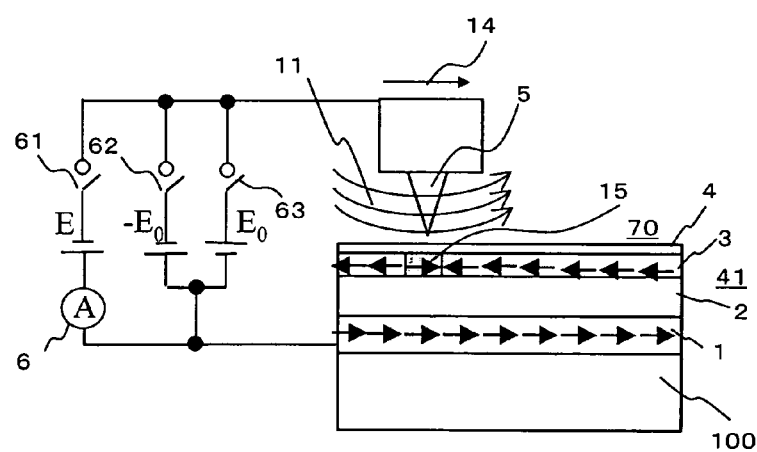
FIG. 4 is a conceptual illustration showing a flux reversal region and an assistance magnetic field.

The region, in which the potential barrier is modulated and writing becomes possible, mainly depends on the distance between the probe 5 and the surface of the multilayer film. In the case when the distance between the probe and the surface is several nanometers which is large enough, the region in which the potential barrier is modulated becomes less than nm. At this time, the magnetic anisotropy energy $K_u V_0$ ($K_u$ is a magnetic anisotropy constant) in the volume $V_0$ at the writing region 15 shown in FIG. 4 is smaller than 60 $k_B T$ which is a standard of the stability of the magnetization. Since this value of 60 $k_B T$ is a standard for the recording magnetization being stable for about 10 years, about 20–30 $k_B T$ is enough to make the magnetization stable in a short period (ns to μs) at the first stage of writing. The metallic probe 5 continues writing up to a volume V ($K_u V > 60$ $k_B T$) where the magnetization becomes stable along the scanning direction 14, but an assistance magnetic field H (11) is applied in the writing magnetization direction from the magnetic pole 12 by energizing the coil 13 at the first stage of writing in which the writing region v having the magnetization M is smaller than the volume V where the magnetization becomes stable. The area in which the assistance magnetic field is applied is an area level corresponding to a volume V where the magnetization becomes stable. Moreover, the timing of the assistance magnetic field application may be simultaneous with or before the timing of the writing electric field application, and the assistance magnetic field may be turned off when the writing region reaches the volume V where the magnetization comes to stabilize.

Figure 5:
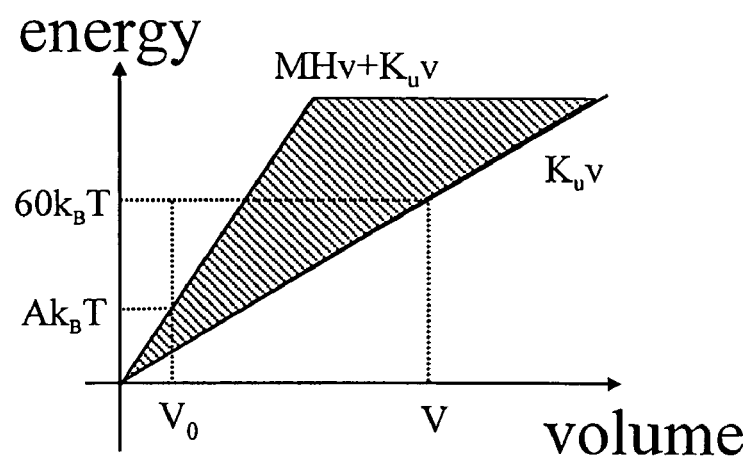
FIG. 5 is a conceptual illustration showing stabilization of magnetic energy by an assistance magnetic field.

The magnetization energy of the magnetization region becomes more stable only by MvH by applying the assistance magnetic field H, resulting in $K_u V_0 + MvH > Ak_B T$. Here, the value of A may be 20 to 30. FIG. 5 shows this situation. The shaded area in the figure shows the stabilization energy caused by applying the assistance magnetic field H. In the case when there is no assistance magnetic field, the magnetic anisotropy energy $K_u V_0$ at the first stage of writing is smaller than $Ak_B T$ which is the standard of stability against thermal fluctuation, thereby, the written magnetic information is lost. However, since the magnetic anisotropy energy $K_u V_0 + MvH$ becomes about $Ak_B T$ which is a standard of stability against thermal fluctuation by applying the assistance magnetic field H, it is possible to maintain a stable writing magnetization.

Figure 6:
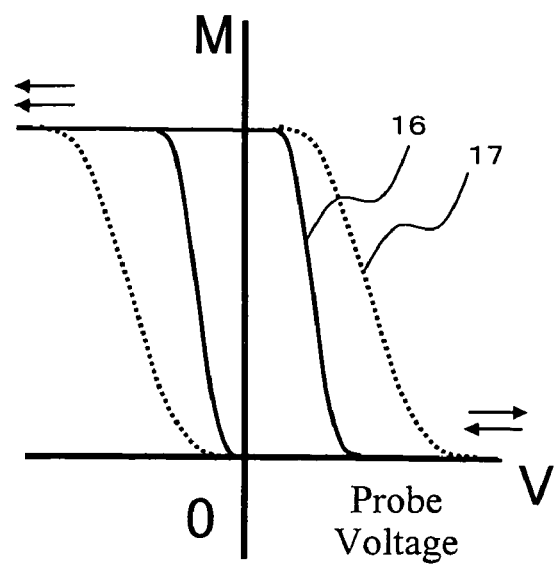
FIG. 6 is a conceptual illustration showing the decrease of writing voltage by an assistance magnetic field.

FIG. 6 shows magnetization hysteresis curves of magnetization writing by an electric field for the cases where the magnetic field assistance exists and does not exist. The threshold of the writing voltage can be made smaller when the magnetic field assistance exists (hysteresis curve 16) compared with the case where it does not exist (hysteresis curve 17). For instance, in the case when an assistance magnetic field is applied having half of the field strength necessary for the flux reversal of the medium, the threshold of the writing voltage can be made about half compared with the case without the assistance magnetic field (hysteresis curve 17).

The magnetic recording system shown in FIG. 1 is one which switches writing and reading magnetic information by using one metallic probe 5. However, it is not necessary to use the same metallic probe for writing and reading magnetic information. Moreover, it is also possible to read magnetic information by using a technique other than the tunneling current flowing between the metallic probe and the magnetic recording medium.

Figure 7:
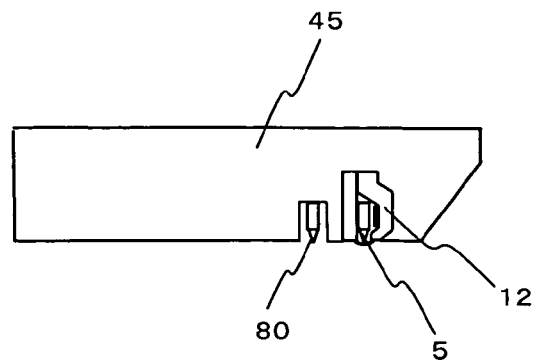
FIG. 7 is a conceptual illustration showing an example of a configuration of the slider.

FIG. 7 is a schematic drawing illustrating an example in which a metallic probe 80 for reading by a tunneling current is provided in a slider 45 in addition to the metallic probe 5 for writing. In this case, the metallic probe 5 has only to write, and the potential E for detecting the tunneling current is applied to the metallic probe 80, and the magnetization direction can be read from the change of the tunneling current. Writing and reading information can be carried out simultaneously by preparing individually the metallic probe 5 for writing and the metallic probe 80 for reading as shown in this example.

Figure 8:
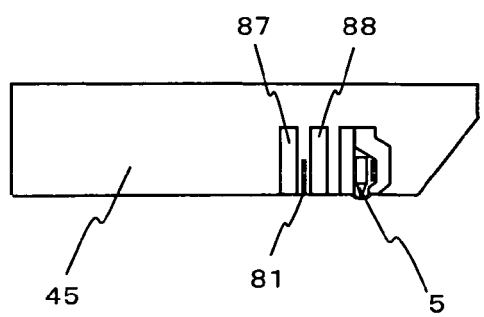
FIG. 8 is a conceptual illustration showing an example of a configuration of the slider.

FIG. 8 is a schematic drawing illustrating an example in which a magnetoresistive sensor 81 such as GMR or TMR etc. is provided in the slider 45 as a sensor for reading magnetic information. The magnetoresistive sensor 81 is formed in a shape sandwiched between two magnetic shields 87 and 88. In this case, the metallic probe 5 has only to write, the magnetic information written in the magnetic recording medium is read out from the resistance change of the magnetoresistive sensor 81.

Figure 9:
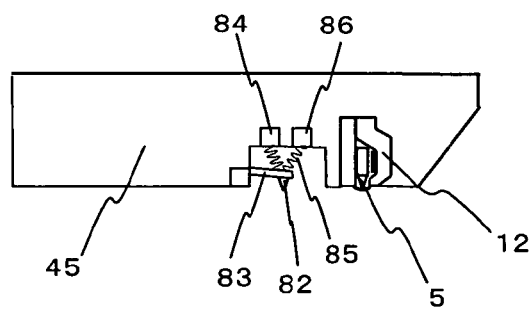
FIG. 9 is a conceptual illustration showing an example of a configuration of the slider.

FIG. 9 is a schematic drawing illustrating an example in which a magnetic probe 82 is provided in the slider 45 as a magnetic reading means. The magnetic probe 82 is provided at the tip of a cantilever 83. Since the force working on the magnetic probe is different depending on the magnetization direction of the medium, as is well known from a Magnetic Force Microscopy (MFM), the displacement of the magnetic probe 82 mounted at the tip of the cantilever 83 changes according to the magnetization direction of the medium. The displacement of the magnetic probe 82 can be detected by an optical lever technique. That is, the laser beam 85 emitted from a semiconductor laser 84 and reflected at the backside of the cantilever 83 is detected by a photodetector 86, and the magnetization direction of the medium can be read out by a change in the detection strength.

EMBODIMENT 2

Figure 10:
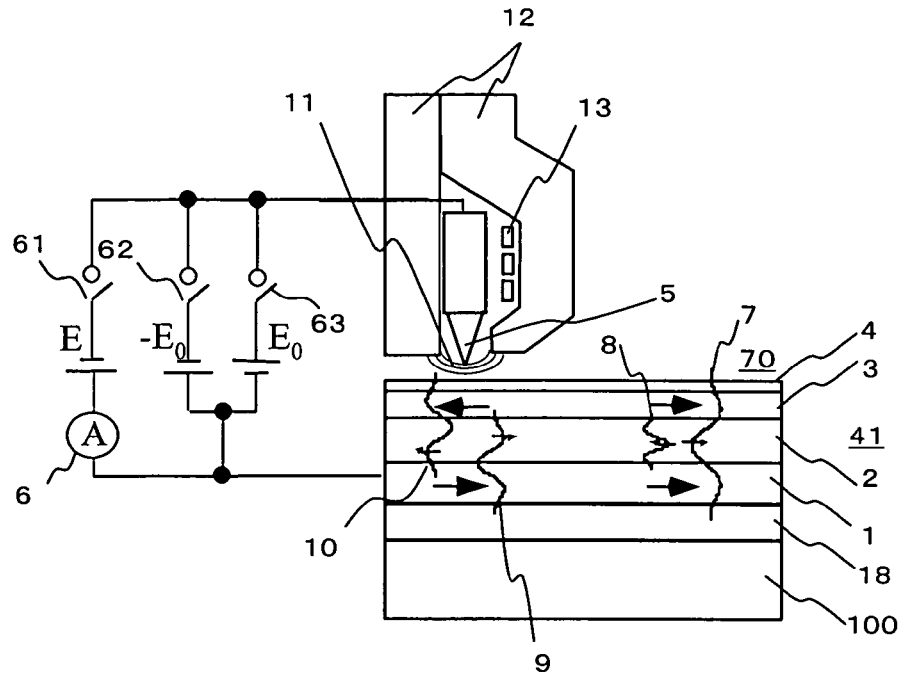
FIG. 10 is a conceptual illustration showing a main part of another embodiment of a magnetic recording system of the present invention.

FIG. 10 is a conceptual illustration showing a main part of another embodiment of a magnetic recording system of the present invention. The magnetic recording medium 70 of this embodiment has a multilayer film 41 in which an antiferromagnetic layer 18, a ferromagnetic metallic layer 1, a non-magnetic metallic layer 2, a ferromagnetic metallic layer 3, and a protection film 4 are laminated on a substrate 100. Here, a non-magnetic material, for instance Au, is used for the protection film 4, but there need not be one. The magnetization direction of the ferromagnetic layer 1 is unidirectionally fixed by the antiferromagnetic layer 18. A voltage $E_0$ or $-E_0$ can be applied between the metallic probe 5 and the multilayer film 41. Moreover, the magnetic pole 12 is provided close to the metallic probe 5, which is a structure such that a magnetic field can be generated at the edge region of the metallic probe 5 from the magnetic pole by energizing the coil 13.

The same as the embodiment 1, electrons in the neighborhood of the Fermi level in the multilayer film 41 are confined in the multilayer film, forming the quantum well states 7 to 10. In the case when the magnetization directions of the ferromagnetic metallic layers 1 and 3 are parallel to each other, electrons having an electron spin antiparallel to the magnetization are almost confined in the non-magnetic metallic layer 2 like the quantum well state 8. On the other hand, electrons having an electron spin direction parallel to the magnetization are confined entirely in the multilayer film 41 like the quantum well state 7. On the other hand, in the case when the magnetization directions of the ferromagnetic metallic layers 1 and 3 are antiparallel, electrons are confined in films different from each other depending on the spin direction such as the quantum well state 9 or the quantum well state 10.

When the metallic probe 5 is brought close to the surface of the protection film 4, the image potentials of the protection film 4 and the metallic probe 5 overlap, resulting in the effective potential in which the quantum well is confined being deformed. Additionally, at this time, the switch 63 or 62 is closed and a voltage of $E_0$ or $-E_0$ is applied between the multilayer film 41 and the metallic probe 5. When the confining potential changes at the surface of the protection film 4, the energy level of the quantum well electrons is changed since the boundary condition to confine the quantum well electrons is changed. The relative magnetization directions of the ferromagnetic metallic layers 1 and 3 are changed by changing the energy of this quantum well level. Because of this, it is possible to write information by changing the magnetization direction of the ferromagnetic layer 3. In this embodiment, a voltage of $E_0$ or $-E_0$ is applied between the multilayer film 41 and the metallic probe 5, and the assistance magnetic field 11 is applied from the magnetic pole 12 in the writing magnetization direction.

In this embodiment, as well as in the embodiment 1, the magnetization direction during writing can be made stable by applying the assistance magnetic field 11 in the writing magnetization direction by the magnetic pole 12 and the coil 13, while the written magnetic information is lost in the case when the assistance magnetic field does not exist.

EMBODIMENT 3

Figure 11:
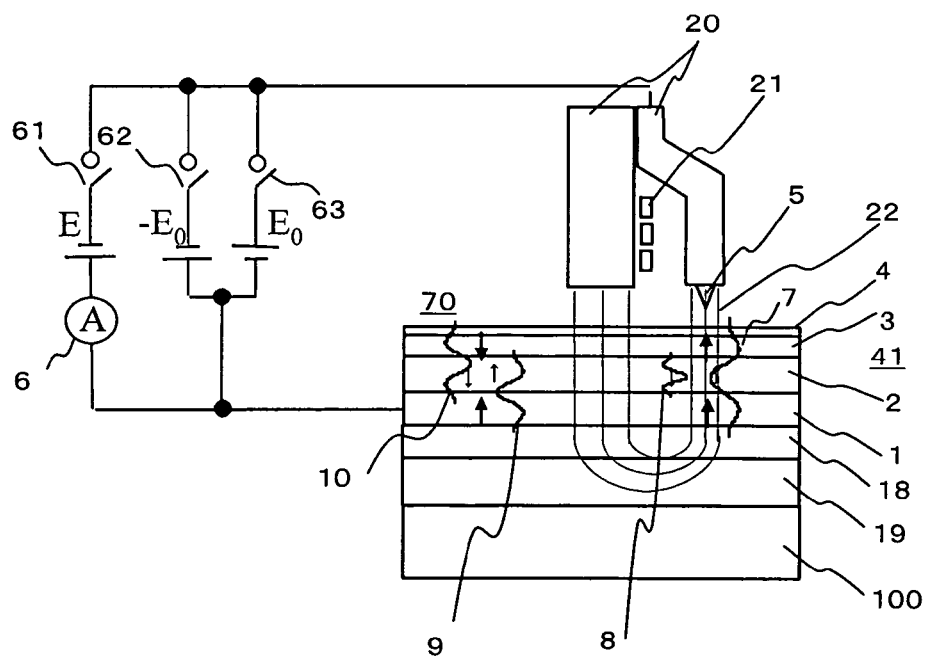
FIG. 11 is a conceptual illustration showing a main part of another embodiment of a magnetic recording system of the present invention.

FIG. 11 is a conceptual illustration showing a main part of another embodiment of a magnetic recording system of the present invention. The magnetic recording medium 70 of this embodiment has a multilayer film 41 in which a soft magnetic layer 19, an antiferromagnetic layer 18, a ferromagnetic metallic layer 1, a non-magnetic metallic layer 2, a ferromagnetic metallic layer 3, and a protection film 4 are laminated on a substrate 100. Here, a non-magnetic material, for instance Au, is used for the protection film 4, but there need not be one. Moreover, the magnetization direction of the ferromagnetic layer 1 is unidirectionally fixed by the antiferromagnetic layer 18, but there need not be one. A voltage $E_0$ or $-E_0$ can be applied between the metallic probe 5 and the multilayer film 41. Furthermore, the magnetic pole 20 is provided close to the metallic probe 5, which is a structure where a magnetic field can be generated along the path from the magnetic pole on the metallic probe 5 side to another magnetic pole through the ferromagnetic metallic layer 3, the ferromagnetic metallic layer 1, and the soft magnetic layer 19 by energizing the coil 21.

The same as the embodiment 1, electrons in the neighborhood of the Fermi level in the multilayer film 41 are confined in the multilayer film, forming the quantum well states 7 to 10. The magnetization direction of the ferromagnetic metallic layer in this embodiment is controlled to be perpendicular to the film surface, while the magnetization direction of the ferromagnetic metallic layer in the embodiment 1 is parallel to the film surface. For instance, in the case when the combination of the ferromagnetic metallic layers 1 and 3/non-magnetic metallic layer 2 is Co/Pd, Co/Pt, Fe/Pt, the magnetization direction becomes perpendicular to the film surface.

In the case when the magnetization directions of the ferromagnetic metallic layers 1 and 3 are parallel to each other, electrons having an electron spin antiparallel to the magnetization are almost confined in the non-magnetic metallic layer 2 like the quantum well state 8. On the other hand, electrons having an electron spin direction parallel to the magnetization are confined entirely in the multilayer film 41 like the quantum well state 7. On the other hand, in the case when the magnetization directions of the ferromagnetic metallic layers 1 and 3 are antiparallel, electrons are confined in films different from each other depending on the spin direction such as the quantum well state 9 or the quantum well state 10.

When the metallic probe 5 is brought close to the surface of the protection film 4, the image potentials of the protection film 4 and the metallic probe 5 overlap, resulting in the effective potential in which the quantum well is confined being deformed. Additionally, at this time, the switch 63 or 62 is closed and a voltage of $E_0$ or $-E_0$ is applied between the multilayer film 41 and the metallic probe 5. When the confining potential changes at the surface of the protection film 4, the energy level of the quantum well electrons is changed since the boundary condition to confine the quantum well electrons is changed. The relative magnetization directions of the ferromagnetic metallic layers 1 and 3 are changed by changing the energy of this quantum well level. Because of this, it is possible to write information by changing the magnetization direction of the ferromagnetic layer 3. In this embodiment, a voltage of $E_0$ or $-E_0$ is applied between the multilayer film 41 and the metallic probe 5, and the assistance magnetic field 22 is applied from the magnetic pole 20 along the writing magnetization direction.

In this embodiment, as well as in the embodiment 1, the magnetization direction during writing can be made stable by applying the assistance magnetic field 22 in the writing magnetization direction by the magnetic pole 20 and the coil 21, while the written magnetic information is lost in the case when the assistance magnetic field does not exist.

EMBODIMENT 4

Figure 12:
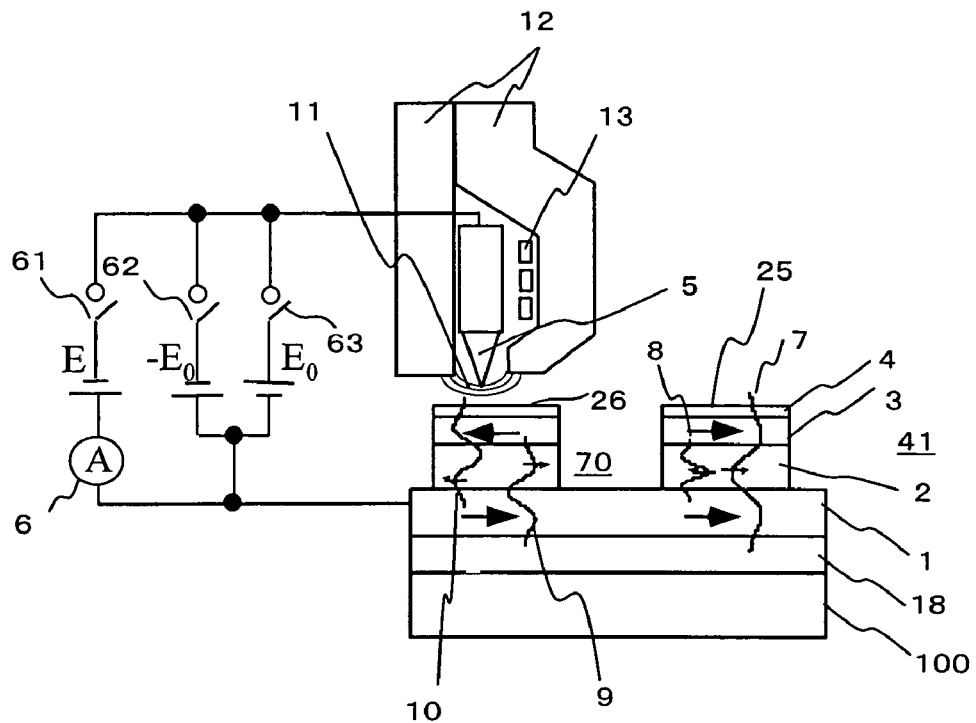
FIG. 12 is a conceptual illustration showing a main part of another embodiment of a magnetic recording system of the present invention.

FIG. 12 is a conceptual illustration showing a main part of another embodiment of a magnetic recording system of the present invention. The magnetic recording medium 70 of this embodiment has a configuration in which an antiferromagnetic layer 18, a ferromagnetic metallic layer 1, a non-magnetic metallic layer 2, a ferromagnetic metallic layer 3, and a protection film 4 are laminated on a substrate 100, and a voltage of $E_0$ or $-E_0$ can be applied between the metallic probe 5 and the multilayer film 41. Here, a non-magnetic material, for instance Au, is used for the protection film 4, but there need not be one. The magnetization direction of the ferromagnetic layer 1 is unidirectionally fixed by the antiferromagnetic layer 18, but there need not be one. Moreover, the magnetic pole 12 is provided close to the metallic probe 5, which is a structure such that a magnetic field can be generated at the edge region of the metallic probe 5 from the magnetic pole by energizing the coil 13.

As shown in FIG. 12, the protection film 4, the ferromagnetic layer 3, and the non-magnetic metallic layer 2 are patterned in a dot shape by lithography through the use of resist patterning, ion milling, and resist removal, resulting in pillar-shaped nano-pillars 25 and 26 being formed. Although the non-magnetic metallic layer 2 is also patterned in the example shown in the figure, it is not necessary that the non-magnetic metallic layer 2 be patterned. Moreover, patterning may be done up to the ferromagnetic layer 1 or the antiferromagnetic layer 18. Furthermore, there may be a plurality of nano-pillars and each pillar works as a memory unit of information.

Figure 13:
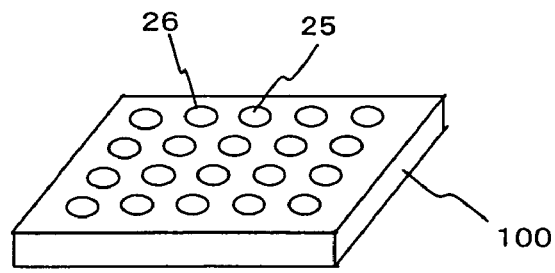
FIG. 13 is a bird's-eye view illustrating a part of this nano-pillar medium.
Figure 14:
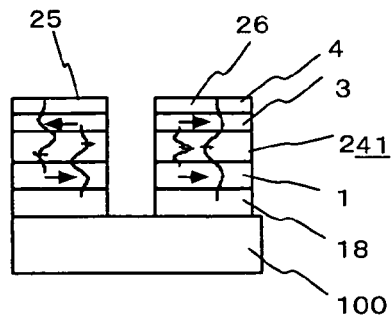
FIG. 14 is another example illustrating fabrication of a nano-pillar.
Figure 14:
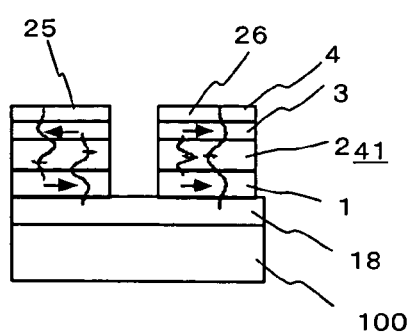
Figure 14:
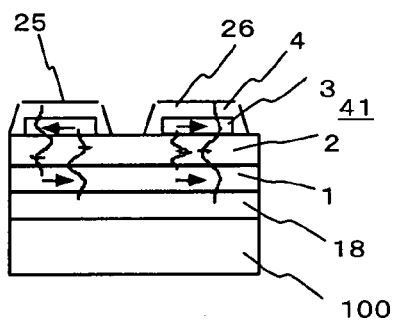

FIG. 13 is a bird's-eye view illustrating a part of this nano-pillar medium. Additionally, FIG. 14 is an example illustrating fabrication of another nano-pillar. FIG. 14A is an example in which patterning is performed up to the antiferromagnetic layer 18; FIG. 14B is an example in which patterning is performed up to the ferromagnetic layer 1; and FIG. 14C is an example in which patterning is performed for the protection film 4 and the ferromagnetic layer 3. The gap of each pillar may be bridged by an insulator such as alumina, etc. or a semiconductor such as Si, etc.

As shown in FIG. 12 and FIG. 14, electrons in the neighborhood of the Fermi level in the multilayer film 41 are confined in the nano-pillars 25 and 26, forming the quantum well states 7 to 10. In the case when the magnetization directions of the ferromagnetic metallic layers 1 and 3 are parallel to each other, electrons having an electron spin antiparallel to the magnetization are almost confined in the non-magnetic metallic layer 2 like the quantum well state 8. On the other hand, electrons having an electron spin direction parallel to the magnetization are confined entirely in the multilayer film 41 like the quantum well state 7. On the other hand, in the case when the magnetization directions of the ferromagnetic metallic layers 1 and 3 are antiparallel, electrons are confined in films different from each other depending on the spin direction such as the quantum well state 9 or the quantum well state 10.

When the metallic probe 5 is brought close to the surface of the protection film 4, the image potentials of the protection film 4 and the metallic probe 5 overlap, resulting in the effective potential in which the quantum well is confined being deformed. Additionally, at this time, the switch 63 or 62 is closed and a voltage of $E_0$ or $-E_0$ is applied between the multilayer film 41 and the metallic probe 5. When the confining potential changes at the surface of the protection film 4, the energy level of the quantum well electrons is changed since the boundary condition to confine the quantum well electrons is changed. The relative magnetization directions of the ferromagnetic metallic layers 1 and 3 are changed by changing the energy of this quantum well level. Because of this, it is possible to write the magnetization direction of the ferromagnetic layer 3. In this embodiment, a voltage of $E_0$ or $-E_0$ is applied between the multilayer film 41 and the metallic probe 5, and the assistance magnetic field 11 is applied from the magnetic pole 12 in the writing magnetization direction.

In this embodiment, as well as in the embodiment 1, the magnetization direction during writing can be made stable by applying the assistance magnetic field 11 in the writing magnetization direction by the magnetic pole 12 and the coil 13, while the written magnetic information is lost in the case when the assistance magnetic field does not exist.

EMBODIMENT 5

Figure 15:
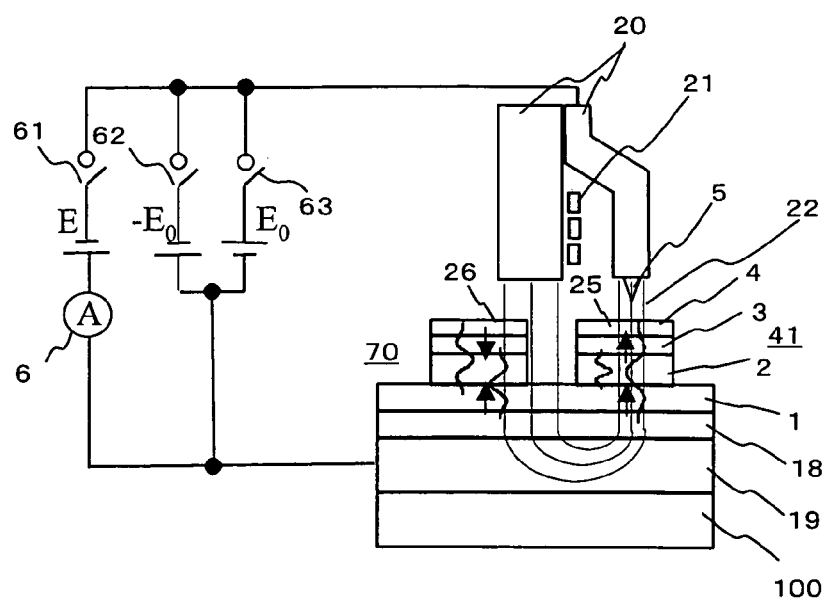
FIG. 15 is a conceptual illustration showing a main part of another embodiment of a magnetic recording system of the present invention.

FIG. 15 is a conceptual illustration showing a main part of another embodiment of a magnetic recording system of the present invention. The magnetic recording medium 70 of this embodiment has a configuration in which a soft magnetic layer 19, an antiferromagnetic layer 18, a ferromagnetic metallic layer 1, a non-magnetic metallic layer 2, a ferromagnetic metallic layer 3, and a protection film 4 are laminated on a substrate 100, and a voltage of $E_0$ or $-E_0$ can be applied between the metallic probe 5 and the multilayer film 41. Here, a non-magnetic material, for instance Au, is used for the protection film 4, but there need not be one. The magnetization direction of the ferromagnetic layer 1 is unidirectionally fixed by the antiferromagnetic layer 18, but there need not be one. Furthermore, it is a structure, in which the magnetic pole 20 is provided close to the metallic probe 5 and a magnetic field can be generated along the path from the magnetic pole on the metallic probe 5 side to another magnetic pole through the ferromagnetic metallic layer 3, the ferromagnetic metallic layer 1, and the soft magnetic layer 19 by energizing the coil 21.

In this embodiment, the magnetization directions of the ferromagnetic metallic layers 1 and 3 are perpendicular to the surface of the substrate, which is different from the embodiment 4. The protection film 4, the ferromagnetic layer 3, and the non-magnetic metallic layer 2 are patterned in a dot shape by lithography through the use of resist patterning, ion milling, and resist removal, resulting in pillar-shaped nano-pillars 25 and 26 being formed. Although the non-magnetic metallic layer 2 is also patterned in the example shown in the figure, it is not necessary that the non-magnetic metallic layer 2 be patterned. Moreover, patterning may be performed up to the ferromagnetic layer 1 or the antiferromagnetic layer 18. Furthermore, there may be a plurality of nano-pillars and each pillar works as a memory unit of information.

Figure 16:
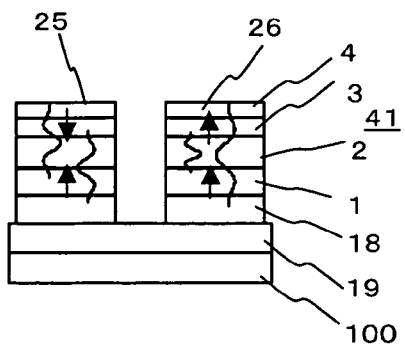
FIG. 16 is another example illustrating fabrication of a nano-pillar.
Figure 16:
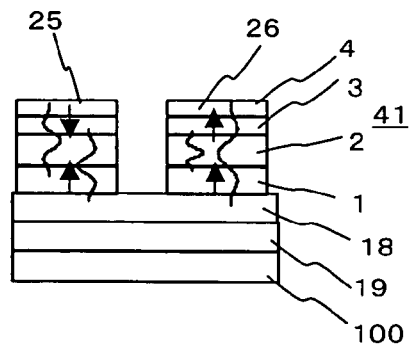
Figure 16:
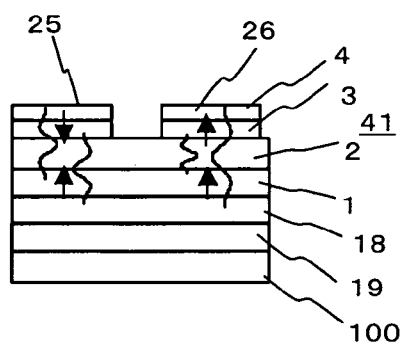
Figure 16:
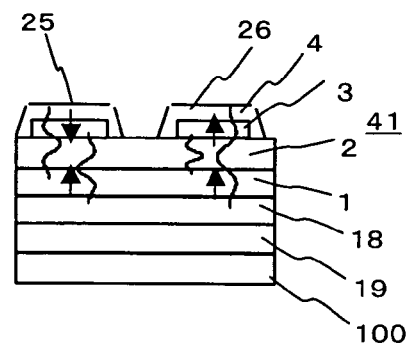

FIG. 16 is an example illustrating the fabrication of another nano-pillar. FIG. 16A is an example in which patterning is performed up to the antiferromagnetic layer 18; FIG. 16B is an example in which patterning is performed up to the ferromagnetic layer 1; and FIGS. 16C and 16D are examples in which patterning is performed for the protection film 4 and the ferromagnetic layer 3. In FIG. 16D, the protection film 4 contacts the non-ferromagnetic metallic layer 2. The gap of each pillar may be bridged by an insulator such as alumina, etc. or a semiconductor such as Si, etc.

As shown in FIG. 15 and FIG. 16, electrons in the neighborhood of the Fermi level in the multilayer film 41 are confined in the nano-pillars 25 and 26, forming the quantum well states 7 to 10, and the condition forming the quantum well depends on the parallel/antiparallel magnetization directions of the ferromagnetic metallic layers 1 and 3. When the metallic probe 5 is brought close to the surface of the protection film 4, the image potentials of the protection film 4 and the metallic probe 5 overlap, resulting in the effective potential in which the quantum well is confined being deformed. Additionally, at this time, the switch 63 or 62 is closed and a voltage of $E_0$ or $-E_0$ is applied between the multilayer film 41 and the metallic probe 5. When the confining potential changes at the surface of the protection film 4, the energy level of the quantum well electrons is changed since the boundary condition to confine the quantum well electrons is changed. The relative magnetization directions of the ferromagnetic metallic layers 1 and 3 are changed by changing the energy of this quantum well level. Because of this, it is possible to write the magnetization direction of the ferromagnetic layer 3. In this embodiment, a voltage of $E_0$ or $-E_0$ is applied between the multilayer film 41 and the metallic probe 5, and the assistance magnetic filed 22 is applied from the magnetic pole 20 in the writing magnetization direction.

In this embodiment, as well as in the embodiment 3, the magnetization direction during writing can be made stable by applying the assistance magnetic field 11 in the writing magnetization direction by the magnetic pole 12 and the coil 13, while the written magnetic information is lost in the case when the assistance magnetic field does not exist.

EMBODIMENT 6

Figure 17:
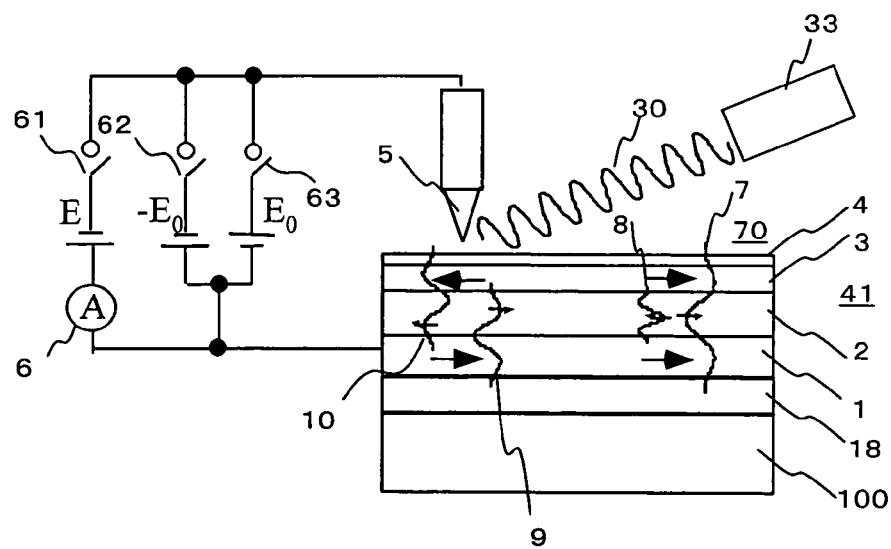
FIG. 17 is a conceptual illustration showing a main part of another embodiment of a magnetic recording system of the present invention.

FIG. 17 is a conceptual illustration showing a main part of another embodiment of a magnetic recording system of the present invention. The magnetic recording medium 70 of this embodiment has a configuration in which a antiferromagnetic layer 18, a ferromagnetic metallic layer 1, a non-magnetic metallic layer 2, a ferromagnetic metallic layer 3, and a protection film 4 are laminated on a substrate 100, and a voltage of $E_0$ or $-E_0$ can be applied between the metallic probe 5 and the multilayer film 41. Here, a non-magnetic material, for instance Au, is used for the protection film 4, but there need not be one. The magnetization direction of the ferromagnetic layer 1 is unidirectionally fixed by the antiferromagnetic layer 18. Moreover, it is a structure in which a laser beam source 33 is provided and a laser beam 30 can be irradiated onto the region of the multilayer film 41 which is opposite the metallic probe 5.

The same as the embodiment 1, electrons in the neighborhood of the Fermi level in the multilayer film 41 is confined in the multilayer film, forming the quantum well state. In the case when the magnetization directions of the ferromagnetic metallic layers 1 and 3 are parallel to each other, electronic states having an electron spin antiparallel to the magnetization are almost confined in the non-magnetic metallic layer 2. On the other hand, electronic states having an electron spin direction parallel to the magnetization are confined entirely in the multilayer film 41. On the other hand, in the case when the magnetization directions of the ferromagnetic metallic layers 1 and 3 are antiparallel, electronic states are confined in films different from each other depending on the spin direction.

When the metallic probe 5 is brought close to the surface of the protection film 4, the image potentials of the protection film 4 and the metallic probe 5 overlap, resulting in the effective potential in which the quantum well is confined being deformed. Additionally, at this time, the switch 63 or 62 is closed and a voltage of $E_0$ or $-E_0$ is applied between the multilayer film 41 and the metallic probe 5. When the confining potential changes at the surface of the protection film 4, the energy level of the quantum well electrons is changed since the boundary condition to confine the quantum well electrons is changed. The relative magnetization directions of the ferromagnetic metallic layers 1 and 3 are changed by changing the energy of this quantum well level. Because of this, it is possible to write the magnetization direction of the ferromagnetic layer 3.

Figure 18:
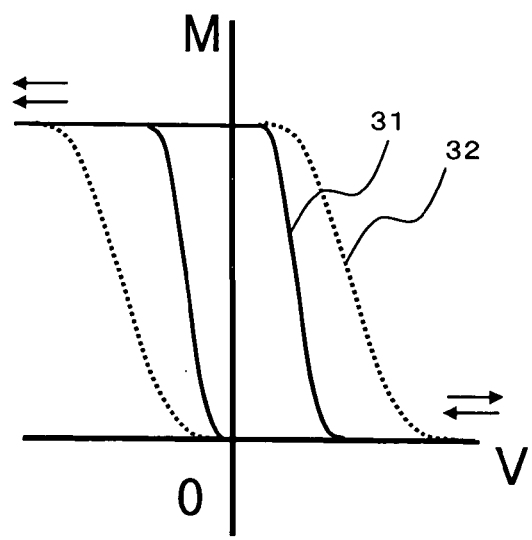
FIG. 18 is a conceptual illustration showing the decrease of writing voltage by laser irradiation.

At this time, plasmon is induced between the probe 5 and the multilayer film 41 by irradiating the laser beam 30 onto the vicinity of the tip of the probe 5. The region of the ferromagnetic recording layer 3 in the vicinity of the tip of the probe 5 is heated by the locally induced plasmon between the probe 5 and the multilayer film 41, resulting in the coercivity of the ferromagnetic recording layer 3 being locally decreased. Because of this, as shown in FIG. 18, the comparison of the case where the laser beam exists (Hysteresis 31) and the case where the laser beam does not exist (Hysteresis 32) indicates that the writing voltage applied to the probe 5 can be decreased by irradiating the laser beam 30. The magnetization directions of the ferromagnetic layers 1 and 3 can be both parallel and perpendicular to the surface. Moreover, nano-pillars shown in FIGS. 14 and 16 may be acceptable for the medium.

EMBODIMENT 7

Figure 19:
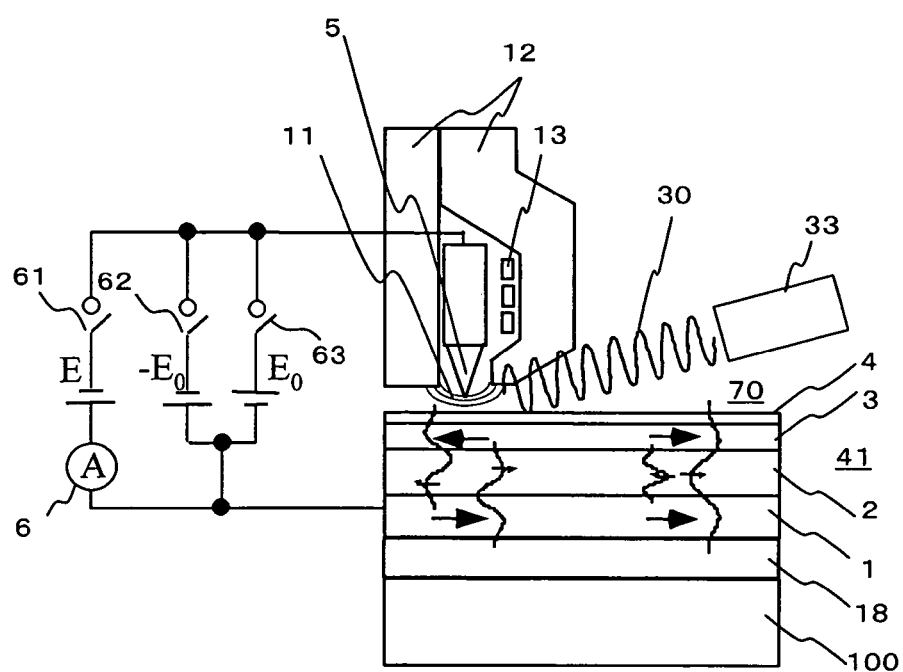
FIG. 19 is a conceptual illustration showing a main part of another embodiment of a magnetic recording system of the present invention.

FIG. 19 is a conceptual illustration showing a main part of another embodiment of a magnetic recording system of the present invention. The magnetic recording medium 70 of this embodiment has a configuration in which a antiferromagnetic layer 18, a ferromagnetic metallic layer 1, a non-magnetic metallic layer 2, a ferromagnetic metallic layer 3, and a protection film 4 are laminated on a substrate 100, and a voltage of $E_0$ or $-E_0$ can be applied between the metallic probe 5 and the multilayer film 41 through the switch 63 or 62. Here, a non-magnetic material, for instance Au, is used for the protection film 4, but there need not be one. The magnetization direction of the ferromagnetic layer 1 is unidirectionally fixed by the antiferromagnetic layer 18. Moreover, it is a structure, in which the magnetic pole 12 is provided close to the metallic probe 5 and a magnetic field can be generated by energizing the coil 13. Furthermore, it is a structure in which a laser beam source 33 is provided and a laser beam 30 can be irradiated onto the region of the multilayer film 41 which is opposite the metallic probe 5.

The same as the embodiment 1, electrons in the neighborhood of the Fermi level in the multilayer film 41 is confined in the multilayer film, forming the quantum well state. In the case when the magnetization directions of the ferromagnetic metallic layers 1 and 3 are parallel to each other, electronic states having an electron spin antiparallel to the magnetization are almost confined in the non-magnetic metallic layer 2. On the other hand, electronic states having an electron spin direction parallel to the magnetization are confined entirely in the multilayer film 41. On the other hand, in the case when the magnetization directions of the ferromagnetic metallic layers 1 and 3 are antiparallel, electronic states are confined in films different from each other depending on the spin direction.

When the metallic probe 5 is brought close to the surface of the protection film 4, the image potentials of the protection film 4 and the metallic probe 5 overlap, resulting in the effective potential in which the quantum well is confined being deformed. In addition, a voltage $E_0$ or $-E_0$ is applied between the multilayer film 41 and the metallic probe 5. When the confining potential changes at the surface of the protection film 4, the energy level of the quantum well electrons is changed since the boundary condition to confine the quantum well electrons is changed. The relative magnetization directions of the ferromagnetic metallic layers 1 and 3 are changed by changing the energy of this quantum well level. Because of this, it is possible to write information by changing the magnetization direction of the ferromagnetic layer 3. At this time, plasmon is induced between the probe 5 and the multilayer film 41 by irradiating the laser beam 30 onto the vicinity of the tip of the probe 5 in conjunction with applying the assistance magnetic field 11 in the writing magnetization direction from the magnetic pole 12. The magnetization direction during writing can be made stable by applying the assistance magnetic field 11, and the coercivity of the ferromagnetic recording layer 3 is locally decreased because the region of the ferromagnetic recording layer 3 in the vicinity of the tip of the probe 5 is heated by the locally induced plasmon between the probe 5 and the multilayer film 41, so that the writing voltage applied to the probe 5 can be decreased.

In this embodiment, as well as in the embodiment 1, the magnetization direction during writing can be made stable by applying the assistance magnetic field 11 in the magnetization direction for writing by the magnetic pole 12 and the coil 13, while the written magnetic information is lost in the case when the assistance magnetic field 11 does not exist. Here, the magnetization directions of the ferromagnetic layers 1 and 3 can be both parallel and perpendicular to the surface. Moreover, nano-pillars shown in FIGS. 14 and 16 may be acceptable for the magnetic recording medium 70.

EMBODIMENT 8

Figure 20:
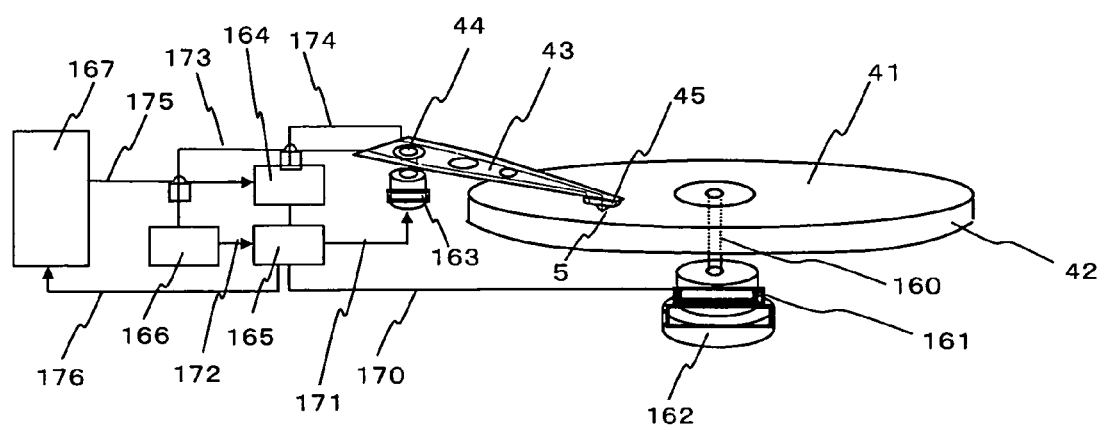
FIG. 20 is a conceptual illustration showing an example of the whole structure of a magnetic recording system of the present invention.

FIG. 20 is a conceptual illustration showing an example of the whole structure of a magnetic recording system of the present invention. It is formed by using the multilayer film 41 explained in each of the aforementioned examples, which consists of the antiferromagnetic layer 18, the ferromagnetic metallic layer 1, the non-ferromagnetic layer 2, the ferromagnetic metallic layer 3, and the protection film 4, as a disk-shaped recording medium 42. The metallic probe 5 and a magnetic pole for applying the assistance magnetic field are provided below the slider 45 placed at the tip of the arm 43 opposite the multilayer film 41. The arm 43 can be rotated around the rotation support shaft 44 and the position is controlled by the arm control motor 163. When the disk-shaped recording medium 42 is rotated around the rotation axis 160 by using the spindle motor 161, the slider 45 floats over the surface of the medium at a predetermined distance. Therefore, the metallic probe 5 is set at almost a constant distance opposite the multilayer film 41.

As described in the embodiments 1 to 7, an electric field is applied between the multilayer film 41 and the metallic probe by applying a voltage between the substrate surface of the disk-shaped recording medium 42 and the metallic probe, resulting in information being recorded to the multilayer film 41 as a domain of the magnetization direction corresponding to the applied voltage. Moreover, stable writing becomes possible caused by applying an assistance magnetic field in the same direction as the magnetization direction for recording, as described in embodiment 1. Here, the multilayer film 41, the rotation axis 160 and the spindle motor 161 supported on the insulation support stand 162 have conductivity and are connected to each other, so that applying a voltage and detecting a tunneling current can be done by using the signal line 170 connected to the spindle motor 161 or the rotation axis 160. In the case when the signal line 170 is connected to the rotation axis 160, the spindle motor 161 and the rotation axis 160 may be electrically insulated from each other.

The writing data are output as writing biasing signal 175 from the data processing system 167 to the voltage application system 164, and the voltage application system 164 applies a probe voltage 174 between the probe 5 and the multilayer film 41. The magnetic information can be read out by reading the magnitude of the tunneling current flowing between the metallic probe 5 and the disk-shaped recording medium 42. This is because the quantum well states created depend on the magnetization directions of the two ferromagnetic layers being parallel or antiparallel, which means that the energy of the quantum level, the density of states of the recording region, depends on the magnetization directions being parallel or antiparallel, as described in embodiment 1. The magnetization direction can be detected by reading the difference of the density of states detecting the change of the tunneling current which flows between the metallic probe 5 and the disk-shaped recording medium 42. For instance, a means for flowing and detecting a tunneling current may be one in which a voltage is applied between the probe 5 and the multilayer film 41 and a current flowing corresponding to it is detected. As described in embodiment 1, a magnetoresistive change using a GMR sensor and a TMR sensor, etc. and displacement of the magnetic probe may be used for detecting the magnetic information.

The reading data signal 176 is processed in the data processing system 167 and input and output, if necessary. Moreover, the current amplification detection system/servo signal generation system 165 creates a servo signal 171 from the detected servo pattern, and controls the track position of the arm 43.

As described above, the potential of the metallic probe 5 against the multilayer film 41 is controlled corresponding to the signal to be recorded, and the written magnetization direction is detected by the tunneling current, resulting in a magnetic recording system similar to the typical magnetic disk system being achieved.

EMBODIMENT 9

Figure 21:
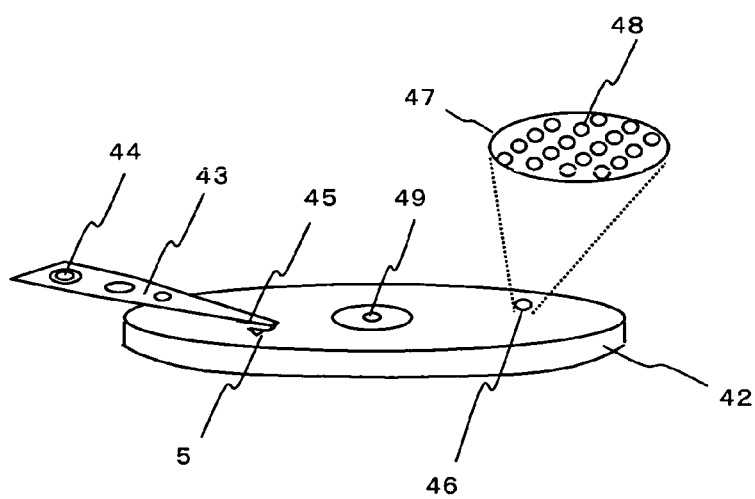
FIG. 21 is a conceptual illustration showing another example of the whole structure of a magnetic recording system of the present invention.

FIG. 21 is a conceptual illustration showing another example of the whole structure of a magnetic recording system of the present invention. As shown in FIGS. 12 and 13, the disk-shaped recording medium 42 is a nano-pillar medium which consists of a plurality of nano-pillars 25 and 26 composed of an antiferromagnetic layer 18, a ferromagnetic metallic layer 1, a non-magnetic metallic layer 2, a ferromagnetic metallic layer 3, and a protection film 4, in which these nano-pillars form the memory units of the recording medium. The multilayer film 41 constituting the disk-shaped recording medium 42 need not have the antiferromagnetic layer 18, the same as each aforementioned embodiment. FIG. 21 is a schematic drawing illustrating an aspect of a region 47 where a section 46 of the disk-shaped recording medium 42 is enlarged in which the nano-pillars 48 are placed concentrically around the rotation center 49. The metallic probe 5 and a magnetic pole for applying the assistance magnetic field are provided below the slider 45 placed at the tip of the arm 43 opposite the multilayer film 41. The configurations of the rotary driving mechanism of the disk-shaped recording medium 42, the rotary driving mechanism of the arm 43, and the signal processing circuit, etc. are the same as FIG. 20, although they are not illustrated in the figure.

The magnetic recording medium of this embodiment also maintains a constant gap between the metallic probe 5 and the disk-shaped recording medium 42 by the lift force from the slider 45 attached to the tip of the arm 43, thereby, the metallic probe 5 can write a magnetization in the nano-pillar 48 at a desired position. On the other hand, the magnetization written in the nano-pillar 48 by the metallic probe 5 can be read out by a change of the tunneling current and a magnetoresistive sensor, the same as embodiment 8.

Figure 22:
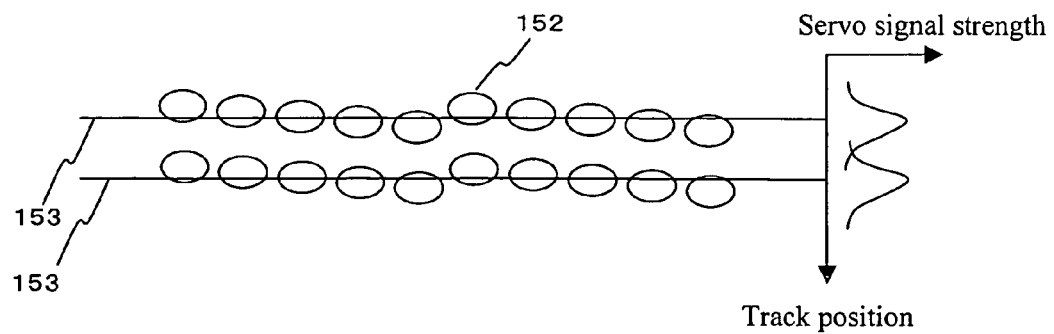
FIG. 22 shows a servo pattern of the rotation recording medium.

FIG. 22 shows the track position dependency of the servo signal strength in the nano-pillar pattern 152 for the servo slightly shifted against the track position 153. The servo signal can be created by using the tunneling current flowing between the metallic probe 5 and the nano-pillar 28, and the resistive change by the magnetoresistive sensor. The track position can be controlled by using the track position dependency of such servo signal strength.

Media described in FIGS. 14, 15, and 16 can be used as a nano-pillar medium except for the medium described in FIG. 12.

EMBODIMENT 10

Figure 23:
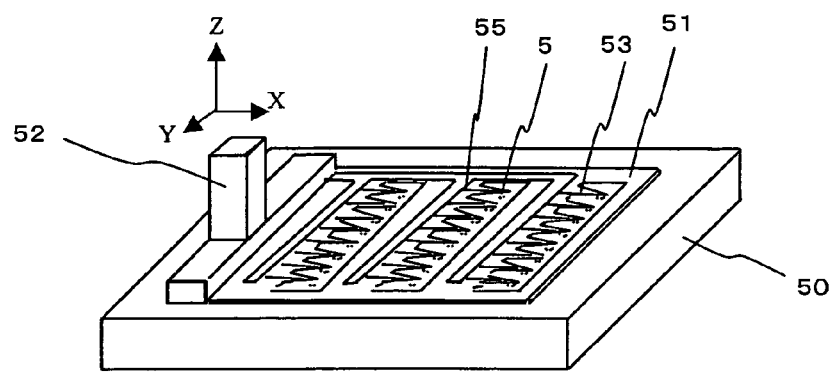
FIG. 23 is a conceptual illustration showing another example of the whole structure of a magnetic recording system of the present invention.

FIG. 23 is a conceptual illustration showing another example of a whole structure of a magnetic recording system of the present invention. The magnetic recording system of this embodiment consists of a recording medium 50 using a multilayer film 41 composed of a antiferromagnetic layer 18, a ferromagnetic metallic layer 1, a non-magnetic metallic layer 2, a ferromagnetic metallic layer 3, and a protection film 4 described in embodiment 2, and a position control mechanism of the metallic probe 5 by a feedback control using a tunneling current and an optical lever technique generally used in an STM (scanning tunnel microscope) system and an AFM (atomic force microscope) system. The recording medium 50 may consist of the memory unit composed of the nano-pillar described in embodiments 4 to 5. Additionally, it need not have the antiferromagnetic layer 18.

Figure 24:
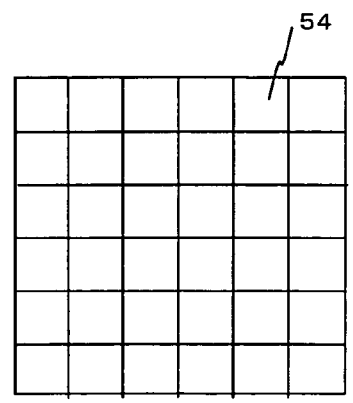
FIG. 24 shows a region where each probe scans.

The recording medium 50 is fixed. The substrate 51 is placed opposite the face on which the multilayer film of the recording medium 50 is formed. A plurality of plate springs are placed respectively in the X and Y directions on the substrate 51. The metallic probe 5 and the magnetic pole are provided as shown in FIG. 1 or FIG. 11 at the tip of each plate spring 53. The substrate 51 can move in a plane (X-Y direction) and in horizontal (Z) directions of the recording medium 50 by the movable mechanism 52. The area where the substrate 51 is moved relative to the recording medium 50 is limited as the motion of the metallic probe 5 in the X direction and Y direction is, at a maximum, up to the front of the memory region 54 in which the next metallic probe 5 performs writing and reading data. FIG. 24 shows the memory region 54 where one metallic probe scans one square.

An electric field is selectively applied by control line 55 between the recording medium 50 and a selected desired metallic probe 5 according to the signal to be recorded, and an assistance magnetic field is applied in the writing magnetization direction, thereby, magnetization can be stably written in the recording medium 50 along the direction according to the recording signal. The magnetization direction written in the recording medium 50 can be read by the magnitude of the tunneling current as mentioned in embodiment 8.

As mentioned above, the recording region of the recording medium 50 is divided and a plurality of metallic probes share the work in each recording region, thereby, read/write to the recording medium is performed. In the case when the input signal is a serial signal, the serial signal is converted to a parallel signal by a serial/parallel converter, and writing is carried out simultaneously by a plurality of metallic probes. Signals reproduced by the plurality of metallic probes are converted into serial signals by a serial/parallel converter and are transmitted to a signal processing circuit in a subsequent stage. As described, for instance, in embodiment VI and VII of JP-A No. 73906/1999, a mechanism using an optical lever type AFM can be applied to control the distance between the metallic probe 5 and the multilayer film of the recording medium 50.

What is claimed is:

1. A method for recording magnetic information, comprising:
    a step for positioning a metallic probe opposite a multilayer film which includes a first ferromagnetic metallic layer, a non-magnetic metallic layer formed over said first ferromagnetic metallic layer, and a second ferromagnetic metallic layer formed over said non-magnetic metallic layer,
    a step for applying an electric field between said multilayer film and said metallic probe and for assisting magnetization direction control of said multilayer film by using said metallic probe,
    wherein, magnetic information is written by forming magnetization corresponding to said applied electric field in a region of said multilayer film which is opposite said metallic probe.

2. A method for recording magnetic information according to claim 1, wherein
    the assistance of the magnetization direction control of said multilayer film by using said metallic probe is performed by applying a magnetic field along the magnetization direction corresponding to said applied electric field in a region of said multilayer film which is opposite said metallic probe.

3. A method for recording magnetic information according to claim 1, wherein
    the assistance of the magnetization direction control of said magnetic recording medium by using said metallic probe is performed by heating a region of said multilayer film which is opposite said metallic probe.

4. A magnetic recording system comprising:
    a magnetic recording medium providing a multilayer film which includes a first ferromagnetic metallic layer, a non-magnetic metallic layer formed over said first ferromagnetic metallic layer, and a second ferromagnetic metallic layer formed over said non-magnetic metallic layer,
    a metallic probe positioned opposite said magnetic recording medium, a means for applying an electric field which applies an electric field between said metallic probe and said magnetic recording medium, a means for assisting the magnetization direction control of said multilayer film by using said metallic probe, wherein, the electric field between said metallic probe and said magnetic recording medium is changed and said assistance means is applied, thereby magnetic information is written by forming magnetization corresponding to said applied electric filed in a region of said multilayer film which is opposite said metallic probe.

5. A magnetic recording system according to claim 4, wherein said assistance means is a means for applying a magnetic field along the magnetization direction corresponding to said applied electric field in a region of said multilayer film which is opposite said metallic probe.

6. A magnetic recording system according to claim 4, wherein said assistance means is a means for heating a region of said multilayer film which is opposite said metallic probe.

7. A magnetic recording system according to claim 4, wherein said second ferromagnetic metallic layer is divided spatially in each recorded information unit.

8. A magnetic recording system according to claim 4, wherein the magnetic information written in said multilayer film is read out by a change in the tunneling current flowing between said metallic probe and the surface of said magnetic recording medium.

9. A magnetic recording system according to claim 4, wherein a ferromagnetic metallic probe is provided and the magnetic information written in said multilayer film is read out by a magnetic repulsion force working between said ferromagnetic metallic probe and said magnetic recording medium.

10. A magnetic recording system according to claim 4, wherein a magnetoresistive sensor is provided and the magnetic information written in said multilayer film is read out by using said magnetoresistive sensor.

11. A magnetic recording system according to claim 4, wherein a means for rotary-driving said magnetic recording medium and an actuator for driving said metallic probe to a desired position on said magnetic recording medium are provided.

12. A magnetic recording system according to claim 4, wherein a plurality of said metallic probes are provided with a predetermined gap and the magnetic information is read/written in each individual metallic probe.

* * * * *